(12) United States Patent
Jung et al.

(10) Patent No.: US 8,248,720 B2
(45) Date of Patent: Aug. 21, 2012

(54) IMAGE PHOTOGRAPHING DEVICE

(75) Inventors: He-Won Jung, Ansan (KR); Hwi-Chol Lee, Ansan (KR)

(73) Assignee: Hysonic Co., Ltd. (KR)

( * ) Notice: Subject to any disclaimer, the term of this patent is extended or adjusted under 35 U.S.C. 154(b) by 84 days.

(21) Appl. No.: 12/865,279

(22) PCT Filed: Dec. 30, 2008

(86) PCT No.: PCT/KR2008/007770
§ 371 (c)(1),
(2), (4) Date: Jul. 29, 2010

(87) PCT Pub. No.: WO2009/096664
PCT Pub. Date: Aug. 6, 2009

(65) Prior Publication Data
US 2010/0328791 A1   Dec. 30, 2010

(30) Foreign Application Priority Data

Jan. 29, 2008  (KR) .................. 10-2008-0009080
Jan. 29, 2008  (KR) .................. 10-2008-0009101

(51) Int. Cl.
*G02B 7/02* (2006.01)
*G02B 15/14* (2006.01)
(52) U.S. Cl. ..................... 359/824; 359/694
(58) Field of Classification Search .............. 359/824
See application file for complete search history.

(56) References Cited

U.S. PATENT DOCUMENTS 5,513,047 A * 4/1996 Matsui ................. 359/824
6,069,867 A   5/2000 Ikegame

FOREIGN PATENT DOCUMENTS

| JP | 08-007305 | 1/1996 |
| JP | 2006-258969 | 9/2006 |
| KR | 10-2005-0110737 | 11/2005 |
| KR | 10-2007-0001667 | 1/2007 |

OTHER PUBLICATIONS

International Search Report—PCT/KR2008/007770 dated Feb. 26, 2009.

* cited by examiner

*Primary Examiner* — James Jones
(74) *Attorney, Agent, or Firm* — Cantor Colburn LLP

(57) ABSTRACT

The present invention relates to an image photographing device, and is invented to absorb vibration of the plate spring when the lens holder is moved, thereby stabilizing rapidly the lens holder. According to one example, the small camera provided with a damper includes a lens holder provided with lens and driven in an optical axial direction, a fixing unit housing the lens holder, a plate spring which is arranged to the upper part or lower part of the lens holder and connects the lens holder to the fixing unit and supports it so that the lens holder is moved in an optical axial direction, a driving unit for driving the lens holder in an optical axial direction, a support unit arranged on the lower parts of the lens holder and the fixing unit, and a damper member attached to the plate spring for absorbing vibrations of the plate spring wherein the damper member is made with polymer chemical having an elastic force and the elastic force of the damper member is smaller than that of the plate spring.

6 Claims, 5 Drawing Sheets

[Fig. 1]
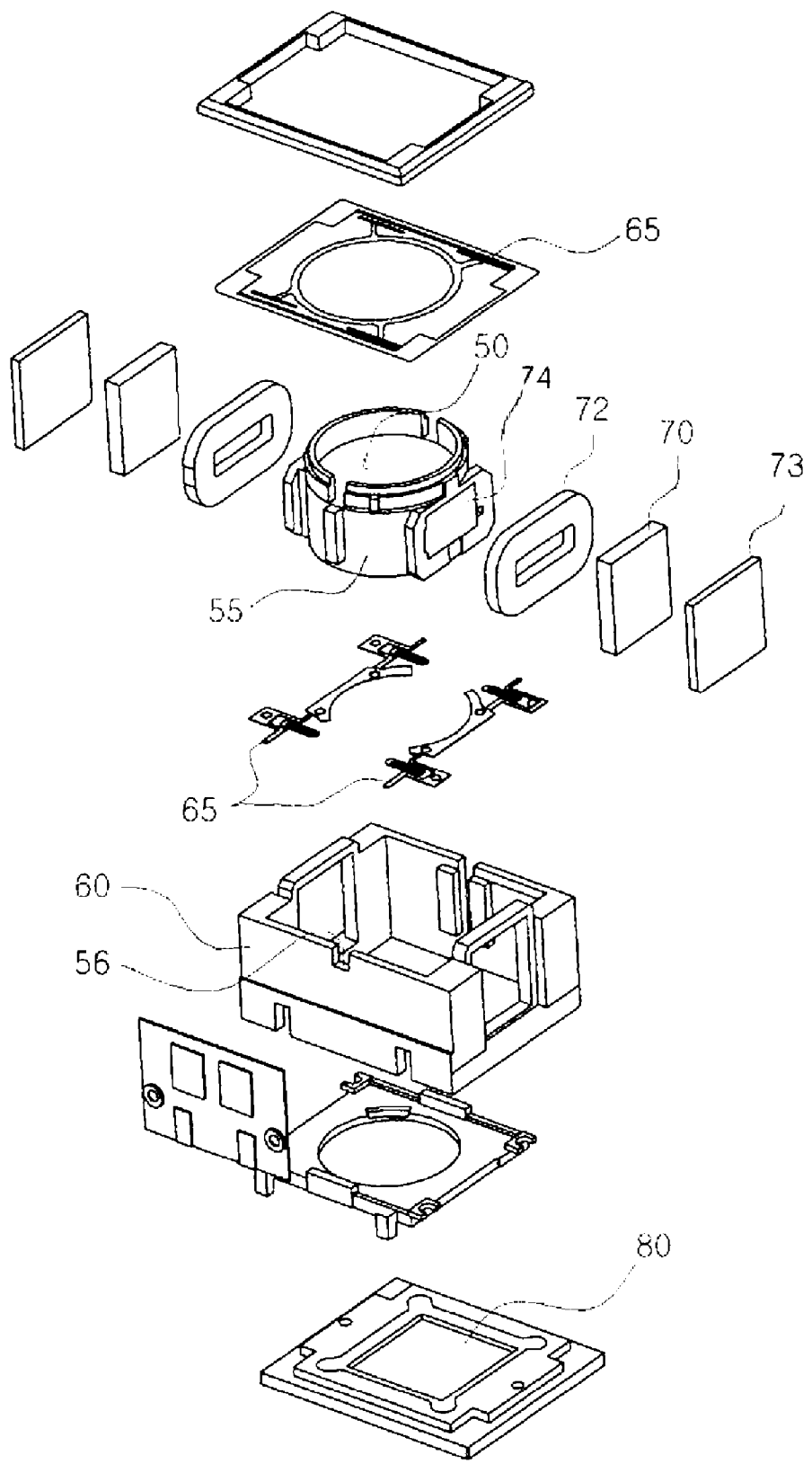

[Fig. 2]
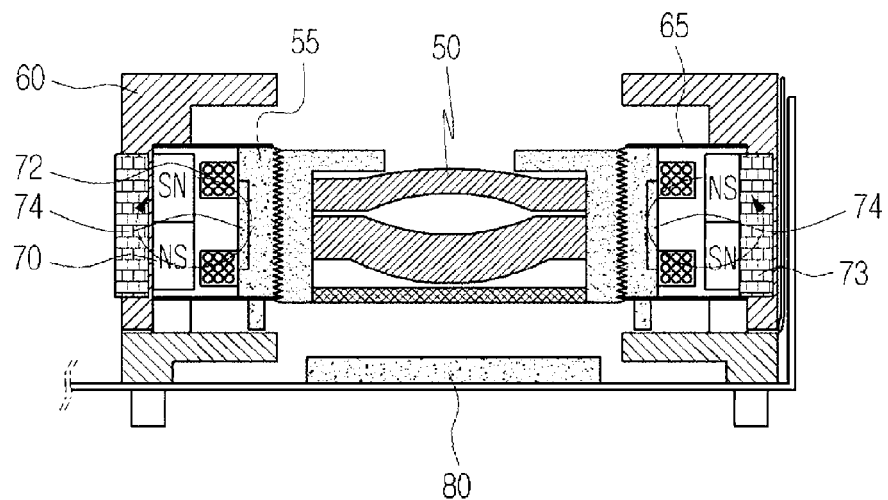
[Fig. 3]
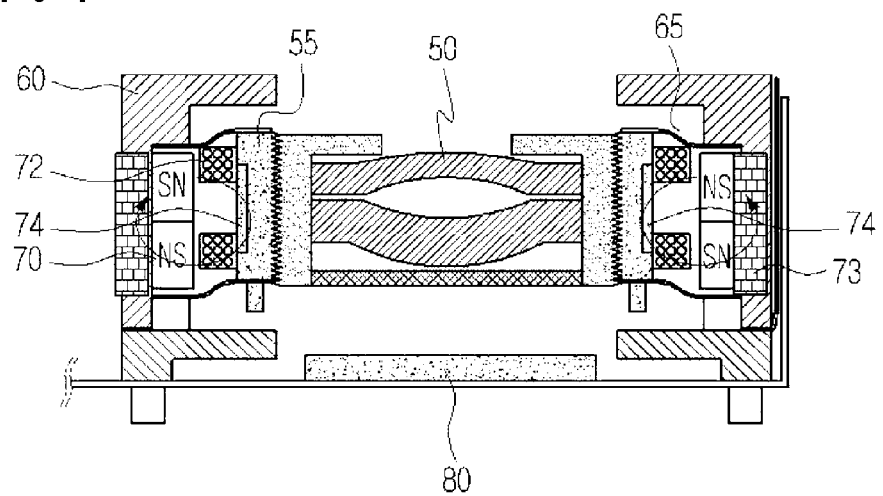
[Fig. 4]
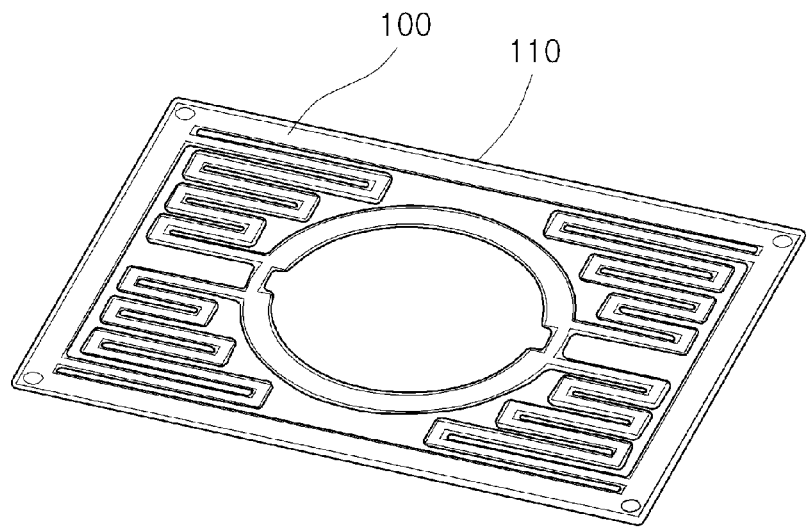

[Fig. 5]
[Fig. 6]
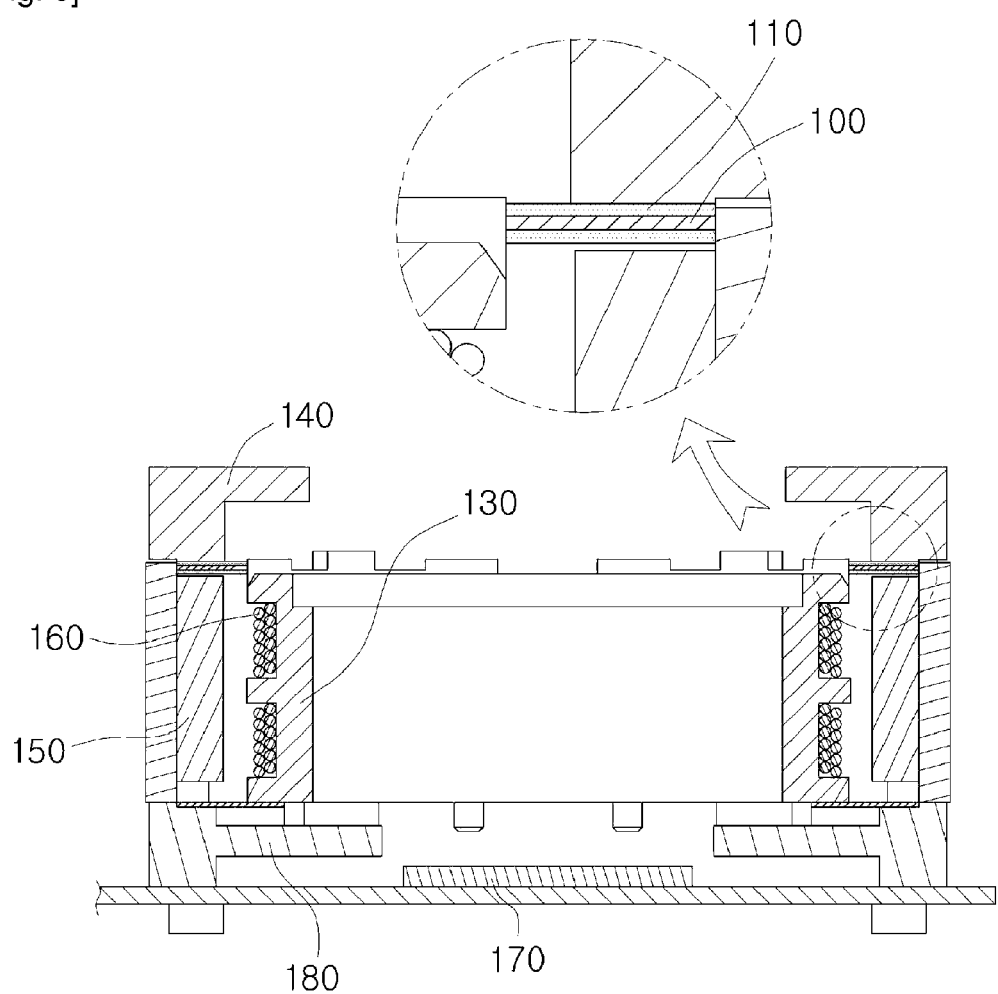

[Fig. 7]
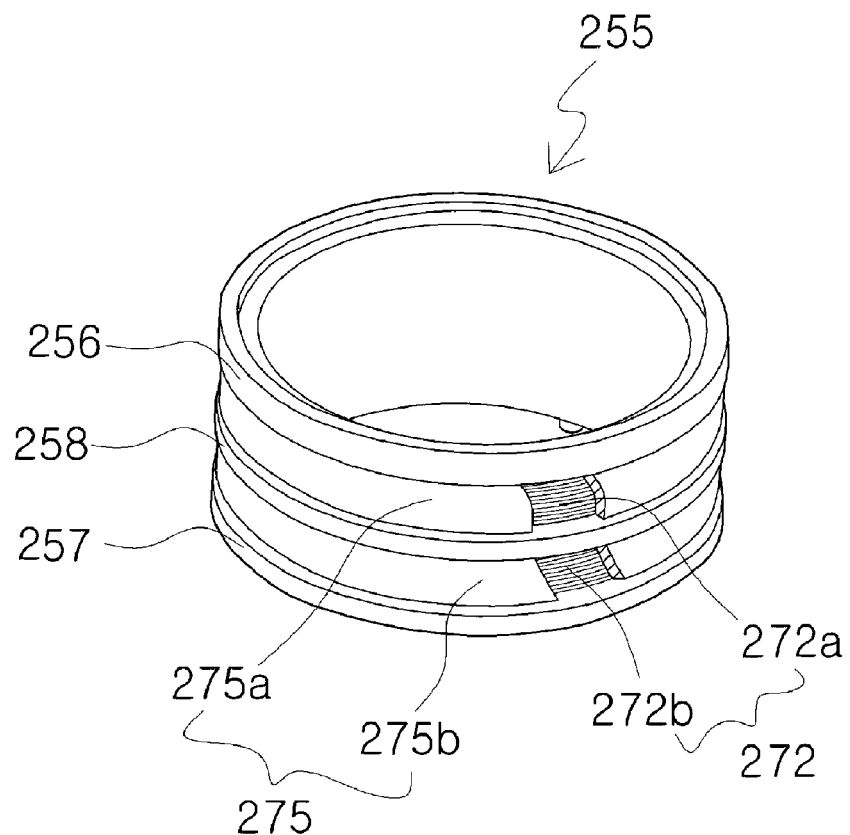
[Fig. 8]
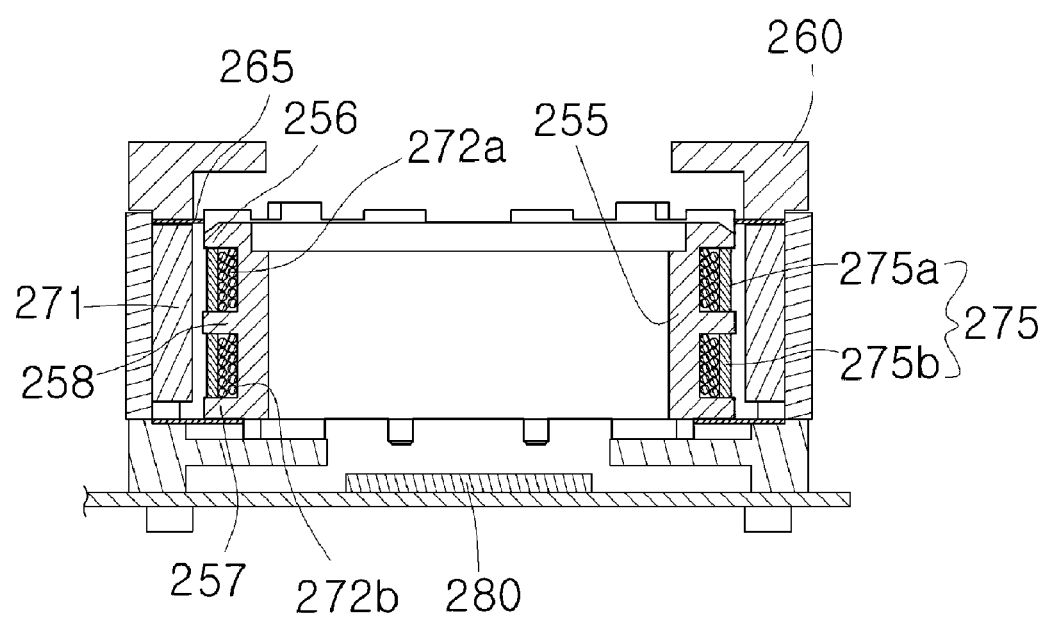

[Fig. 9]
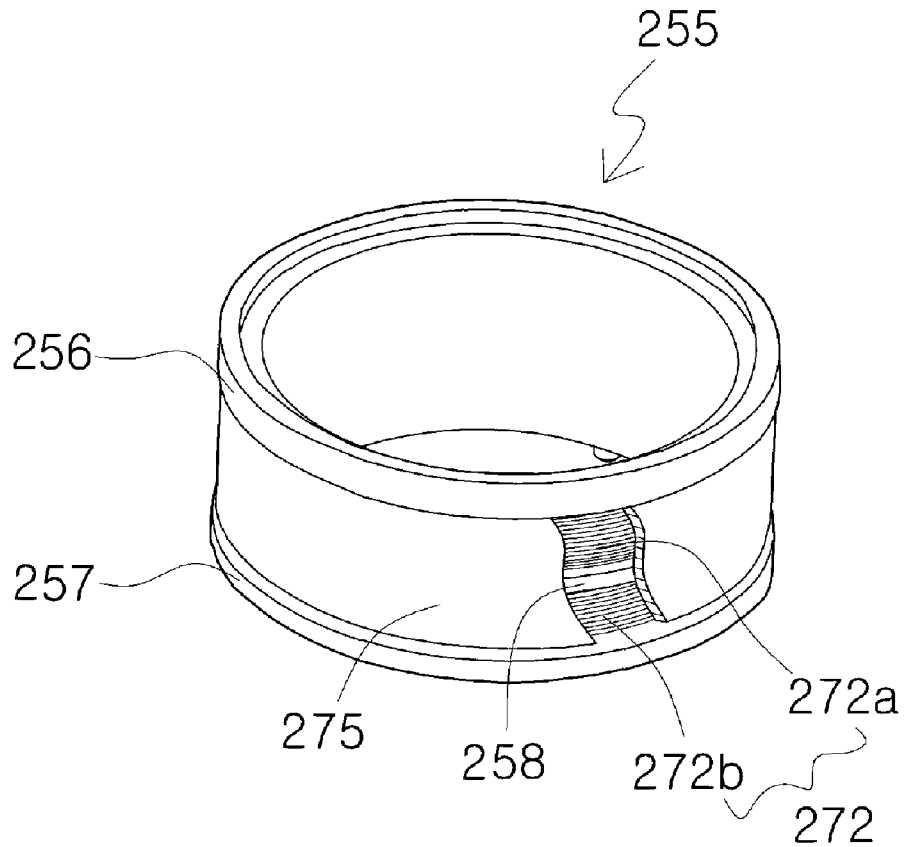
[Fig. 10]
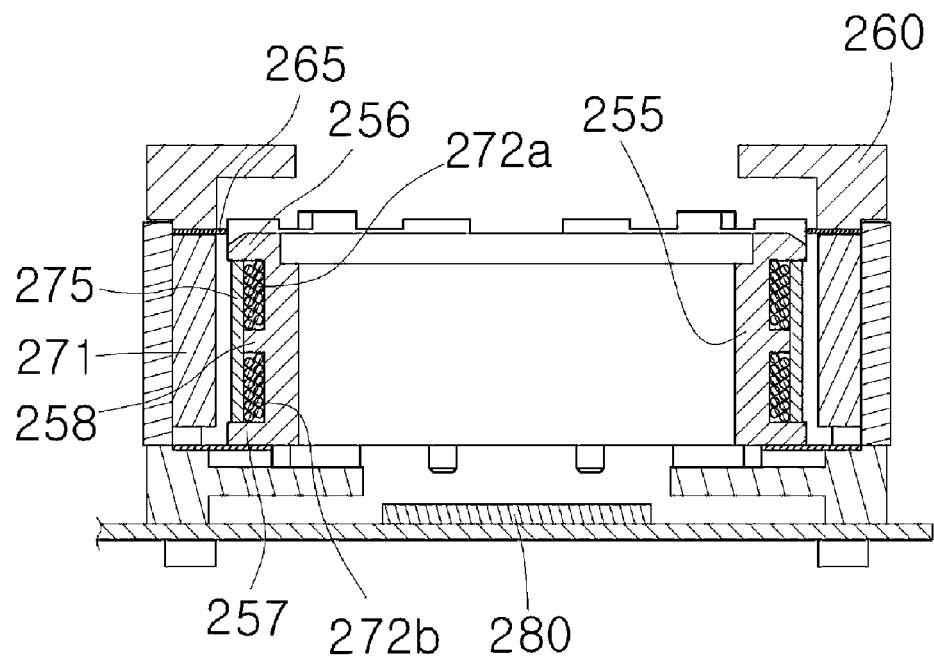

IMAGE PHOTOGRAPHING DEVICE

TECHNICAL FIELD

The present invention relates to an image photographing device, more particularly, to an image photographing device, in which small vibrations which are produced in a long time period after a lens holder supported on a plate spring is driven, thereby stabilizing rapidly the lens holder.

BACKGROUND ART

As a camera module has been developed increasingly, the camera module has been mounted on various equipments such as a digital camera, a note book computer, PMP, MP3, etc.

In particular, the camera module is mounted on most of mobile communication terminals such as cellular phones and is appeared in a market and used increasingly.

FIG. 1 is an exploded and perspective view of a conventional small camera, and FIG. 2 is a sectional view showing a driving unit shown in FIG. 1 before it is driven and FIG. 3 is a sectional view showing the driving unit shown in FIG. 1 after it is driven.

As shown in FIGS. 1 to 3, a conventional small camera includes a lens group 50 comprising a plurality of lens for adjusting an amplification of a subject to be pictured, a lens holder 55 for mounting the lens group 50 and driving in an optical axial direction, a fixing unit 60, a plate spring 65 to be supported to the fixing unit 60 for guiding the lens holder 55 to be moved in an optical axial direction, a magnet 70 fixed to the fixing unit 60, a wound coil 72 fixed to the lens holder 55 in such a way to be exposed to a magnetic filed of the magnet 70 and further for producing a force to move the lens holder 55 in an optical axial direction by receiving a magnetic flux when a electric current is applied thereto, a magnetic body 74 fixed to the lens holder 55 and further for moving the lens holder 55 with an attractive force to the magnet 70 and fixing it to a predetermined location, an image sensor 80 for picturing an image of a subject to be pictured passed through the lens group 50, and a control unit for controlling the wound image 72 and the image sensor 80.

Here, the plate springs 65 are mounted to the upper and lower part of the lens holder 55, respectively, and acts to guide the lens holder 55 to be moved precisely in an optical axial direction when the lens holder 55 is driven up and down by the wound coil and the magnet 70 as shown in FIG. 3.

Additionally, the plate spring 65 acts to return the lens holder 55 to its initial location as shown in FIG. 2 with an elastic recovery force when the lens holder 55 is moved upward or downward as shown in FIG. 3.

Meanwhile, the plate spring 65 keeps a horizontal state as shown in FIG. 2 when it is vibrated continuously up and down through an inertia force moving the lens holder 55 up and down and then a predetermined time period is passed.

Accordingly, there arises a problem in that it takes much time for the lens group 50 mounted to the lens holder 55 to decide a focus of a subject to be pictured.

In addition, there arises another problem in that the plate spring 65 is made with typically iron material and thus when the plate spring 65 is moved excessively up and down, a deformation to the plate spring 65 is occurred or a noise caused from a contact of the upper surface or lower surface of the plate spring 65 with other components is occurred.

DISCLOSURE OF INVENTION

Technical Problem

The present invention has been proposed to solve the above drawbacks and the object of the present invention relates to provide an image photographing device in which a lens holder is stabilized rapidly when the lens holder is moved up and down and noise production is avoided when a plate spring is contacted with other components.

Technical Solution

In order to achieve the above object, according to a first embodiment of the present invention, there is provided an image photographing device provided with a damper comprising a lens holder provided with lens and driven in an optical axial direction, a fixing unit housing the lens holder;

a plate spring which is arranged to the upper part or lower part of the lens holder and connects the lens holder to the fixing unit and supports it so that the lens holder is moved in an optical axial direction, a driving unit for driving the lens holder in an optical axial direction;

a support unit arranged on the lower parts of the lens holder and the fixing unit, and a damper member attached to the plate spring for absorbing vibrations of the plate spring wherein the damper member is made with polymer chemical having an elastic force and the elastic force of the damper member is smaller than that of the plate spring.

The damper member is made with a coating agent of elastomer material, a coating agent of elastic rubber material and a coating agent of silicon rubber, and further applied to the plate spring.

Additionally, the damper member is applied to the upper surface or lower surface of the plate spring.

In order to achieve the above object, according to a second embodiment of the present invention, there is provided an image photographing device comprising a lens holder provided with lens and driven in an optical axial direction, a fixing unit housing the lens holder, a plate spring which is arranged to the upper part or lower part of the lens holder and connects the lens holder to the fixing unit and supports it so that the lens holder is moved in an optical axial direction, a magnet fixed to the fixing unit in a direction to the lens holder, coils surrounding the lens holder to be exposed to a magnetic field of the magnet, and a non-magnetic conductive body surrounding the lens holder in a parallel to the coils to be exposed to a magnetic field of the magnet wherein an upper seating projection is formed protrudingly on the upper part of the lens holder in an outer peripheral surface direction and a lower seating projection is formed protrudingly on the lower part of the lens holder in an outer peripheral surface direction, and further the coil and the non-magnetic conductive body are mounted to surround the lens holder between the upper seating projection and lower seating projection.

The projection lengths of the upper seating projection and the lower seating projection are larger than a summing thickness of the coil and the non-magnetic conductive body.

A middle seating projection is formed protrudingly on a middle part of the lens holder in an outer peripheral surface direction, and the coil includes an upper coil arranged between the upper seating projection and the lower seating projection and a lower coil arranged between the middle seating projection and the lower seating projection.

A projection length of the middle seating projection is larger than a summing thickness of the coil and the non-magnetic conductive body and the non-magnetic conductive body includes an upper non-magnetic conductive body covering the upper coil and a lower non-magnetic conductive body covering the lower coil.

In addition, a projection length of the middle seating projection is smaller than those of the upper seating projection and the lower seating projection and larger than a thickness of the coil, and further the non-magnetic conductive body covers all of the upper seating projection, the middle seating projection and the lower coil between the upper seating projection and the lower seating projection.

ADVANTAGEOUS EFFECTS

According to the image photographing device of the first embodiment of the present invention as aforementioned, the following advantageous effects are obtained.

Since the damper member made with polymer chemical having an elastic force is applied to the plate spring, an up and down vibration force of the plate spring is dampened by the damper member, thereby returning rapidly to its initial location.

Particularly, since an elastic force of the damper member is smaller than that of the plate spring, up and down vibration of the plate spring can be minimized, thereby returning rapidly the plate spring a horizontal state.

Additionally, the damper member to be applied to the plate spring is made with not oil or fluid gel but elastomeric coating agent having an elastic force, a coating agent of elastic rubber or silicon rubber, the damper member made with polymer chemical can be avoided being washed after manufacturing products and washing them.

In addition, since the damper member is applied to the upper surface and lower surface of the plate spring, even though the lens holder is moved excessively, the damper member made with polymer chemical is contact with other components, thereby minimizing noise production.

According to the image photographing device of the second embodiment of the present invention as aforementioned, the following advantageous effects are obtained.

Since the non-magnetic conductive body is adapted to be fixed to the lens holder, a manufacturing process is simple.

Additionally, the non-magnetic conductive body can be avoided being slid to the upper part and lower part of the lens holder and departed by the upper seating projection and lower seating projection.

In addition, the upper coil and the lower coil are arranged on the upper part and the lower part of the middle seating projection, respectively, and thus the upper coil and the lower coil can be avoided being contacted each other.

BRIEF DESCRIPTION OF DRAWINGS

Further objects and advantages of the invention can be more fully understood from the following detailed description taken in conjunction with the accompanying drawings in which:

FIG. 1 is an exploded and perspective view of a conventional small camera;

FIG. 2 is a sectional view showing a driving unit shown in FIG. 1 before it is driven;

FIG. 3 is a sectional view showing the driving unit shown in FIG. 1 after it is driven;

FIG. 4 is a perspective view showing a plate spring of an image photographing device according to a first embodiment of the present invention;

FIG. 5 is a cross-sectional view showing the plate spring shown in FIG. 4;

FIG. 6 is a cross-sectional view showing the image photographing device according to the first embodiment of the present invention;

FIG. 7 is a perspective view showing a plate spring of an assembled configuration of a lens holder and a non-magnetic conductive body mounted to the image photographing device according to a second embodiment of the present invention;

FIG. 8 is a cross-sectional view showing the image photographing device according to the second embodiment of the present invention;

FIG. 9 is a perspective view showing a plate spring of an assembled configuration of a lens holder and a non-magnetic conductive body mounted to the image photographing device according to a third embodiment of the present invention; and FIG. 10 is a cross-sectional view showing the image photographing device according to the third embodiment of the present invention.

MODE FOR THE INVENTION

Hereinafter, the first embodiment of the present invention will be described with reference to the accompanying drawings.

FIG. 4 is a perspective view showing a plate spring of an image photographing device according to a first embodiment of the present invention, FIG. 5 is a cross-sectional view showing the plate spring shown in FIG. 4 and FIG. 6 is a cross-sectional view showing the image photographing device according to the first embodiment of the present invention.

The image photographing device provided with a damper according to the present invention, as shown in FIG. 6, includes a lens holder 130, a fixing unit 140, a plate spring 100, a driving unit, a supporting unit 180, a damper member 110 and an image sensor 170, etc.

Here, a plurality of lens is mounted to the lens holder 130 and driven in an optical axial direction.

In addition, the lens holder 130 is arranged inside the fixing unit 140 which is opened up and down, that is, in an optical axial direction.

Furthermore, the plate spring 100 is arranged on the upper part and/or lower part of the lens holder 130 and connects the lens holder 130 to the fixing unit 140 and supports it so that the lens holder 130 is moved in an optical axial direction.

Meanwhile, the driving unit drives includes a magnet 150, coils 160, etc., and drives the lens holder 130 in an optical direction.

The supporting unit 180 is arranged on the lower part of the lend holder 130 and the fixing unit 140 and connected to the fixing unit 140.

Additionally, the image sensor 170 is arranged on the lower part of the lens holder 130.

The constitution of the present invention as aforementioned is similar to that of a prior art except for the plate spring 100 and thus a detailed description thereof is omitted.

The plate spring 100 is arranged on the upper part and/or lower part of the lens holder 130 as aforementioned and supports elastically the lens holder 130.

The inner side of the plate spring 100 is connected to the lens holder 130 and the outer side thereof is connected to the fixing unit 140.

A damper member 110 is attached to the plate spring 100 for absorbing vibrations thereof as shown in FIGS. 4 and 5.

The damper member 110 is made with a polymer chemical having an elastic force and further the elastic force of the damper member 110 is smaller than that of the plate spring 100 such that the damper member 110 can absorb the vibration of the plate spring 100.

That is, since the elastic force of the damper member 110 is smaller than that of the plate spring 100, the damper member 110 restricts an up and down movement of the plate spring 100 when the plate spring 100 is vibrated up and down.

The damper member 110 is made with elastomeric coating agent having an elastic force, a coating agent of elastic rubber or silicon rubber and preferably is applied to the plate spring 100.

Since the damper member 110 is made with elastomeric coating agent of polymer chemical having an elastic force, a coating agent of elastic rubber or silicon rubber, the damper member 110 can be avoided being washed after manufacturing the photographing device and washing it.

Particularly, the silicon rubber refers to silicate rubber having fluidity at a room temperature in a white color or diluted yellow.

The silicon rubber has a molecular weight larger than that of silicon oil, which is a few hundreds of thousand, and some of methyl group —CH3, which is commercially obtainable, may be substituted with a phenyl group —C6H5 or a vinyl group CH2=CH2

Additionally, the silicon rubber has a good heat-resistance and does not lose rubber elasticity.

The damper member 110 of polymer chemical may be applied overall the plate spring 100 and further is applied at least on the upper surface and lower surface of the plate spring 100.

Since damper member 110 made with a polymer chemical of elastic material is applied to the upper and/or lower surface of the plate spring 100, the damper member 110 dampens vibration force of the plate spring 100 when the plate spring 100 is moved and vibrated up and down.

In addition, even though the plate spring 100 is moved excessively up and down and the upper or lower surface of the plate spring 100 is contacted with other components, the damper member 110 having an elastic force is applied to the upper or lower surface of the plate spring 100, thereby avoiding noise caused from the contact.

Hereinafter, operations of the image photographing device according to the present invention will be described in detail.

When the lens holder 130 is moved up and down by the driving unit, the plate spring 100 is bent upward or downward.

After that, when the lens holder 130 is to be returned to its initial location, force produced by the driving unit is to be cut off.

For example, when the driving unit is comprised of the magnet 150 and the wound coil 160, the power source is stopped in a state that the lens holder 130 has been moved up and down through an electric magnetic force produced by the magnet 150 and the wound coil 160 and thus further force is not applied to the lens holder 130, and the lens holder 130 intends to be returned to its initial location through an elastic recovery force of the plate spring 100.

At this time, the lens holder 130 is vibrated up and down through an elastic recovery force of the plate spring 100 and intends to be returned to its initial location.

However, since the damper member 110 of polymer chemical having an elastic force is applied to the plate spring 100, the vibration of the plate spring 100 is damped through the damper member 110 and the plate spring 100 is to be returned promptly to its initial location.

In particular, since the elastic force of the damper member 110 is smaller than that of the plate spring 100, up and down vibrations of the plate spring 100 can be minimized, thereby returning promptly the plate spring 100 to a horizontal state.

Additionally, since the damper member 110 applied to the plate spring 100 is made with not oil or fluid gel but elastomeric coating agent having an elastic force, a coating agent of elastic rubber or silicon rubber, the damper member 110 made with polymer chemical can be avoided being washed after manufacturing products and washing them.

Meanwhile, since the damper member 110 is applied to the upper surface and lower surface of the plate spring 100, even though the lens holder 130 is moved excessively, the damper member 110 made with polymer chemical is contact with other components, thereby minimizing noise production.

Hereinafter, the second embodiment of the present invention will be described in detail.

FIG. 7 is a perspective view showing a plate spring of an assembled configuration of a lens holder and a non-magnetic conductive body mounted to the image photographing device according to a second embodiment of the present invention, and FIG. 8 is a cross-sectional view showing the image photographing device according to the second embodiment of the present invention.

As shown in FIGS. 7 and 8, the image photographing device includes lens (not shown), a lens holder 255, a fixing unit 260, a plate spring 265, a magnet 271, coils 272, a non-magnetic conductive body, an image sensor 280 and a control unit, etc.

The lens is formed as a plurality in order to vary amplification of a subject to be pictured.

The lens is mounted inside the lens holder 255 which is driven in an optical axial direction.

The fixing unit 260 acts to as an outer case of the image photographing device and thus other components such as the lens holder 255 are embedded inside the fixing unit 260.

The plate springs 265 are arranged on the upper part and lower part of the lens holder 255 and further connect the lens holder 255 to the fixing unit 260 and support it such that the lens holder 255 is moved in an optical axial direction.

The magnet 271 is fixed to the fixing unit 260 opposing to the coil 272 in a lateral direction of the lens holder 255.

At this time, the magnet 271 is arranged with different polarities upward and downward.

The coils 272 produce an electric magnetic force under Fleming left hand rule to drive the lens holder 255 in an optical axial direction by receiving a magnetic force from the magnet 271 when power source is supplied from the control unit.

Among the constitutional elements, lens, the fixing unit 260, the plate spring 265, the magnet 271, and the image sensor, etc. are the same as the first embodiment, and thus detailed descriptions thereof are omitted.

The lens holder 255 is formed as a hollow cylinder shape, on the upper part of an outer peripheral surface of which an upper seating projection is formed protrudingly and on the lower part of the outer peripheral surface of which a lower seating projection is formed protrudingly, and on the middle part of the outer peripheral surface of which a middle seating projection is formed protrudingly.

The upper seating projection 256, the lower seating projection 257 and the middle seating projection 258 are formed in a parallel to a projection direction, respectively.

Here, the respective projection lengths of the upper seating projection 256, the lower seating projection 257 and the middle seating projection 258 may be same.

The coils 272 and the non-magnetic conductive body 275 are mounted to surround the lens holder 255 between the upper seating projection 256 and the lower seating projection 257.

In particular, an upper coil 272a of the coils 272 is arranged between the upper seating projection 256 and the middle seating projection 258 and further a lower coil 272b is arranged between the lower seating projection 257 and the middle seating projection 258.

The upper coil 272a and the lower coil 272b are divided into the upper part and lower part with the middle seating projection 258 and thus the upper coil 272a and the lower coil 272b can be avoided being contacted each other.

Furthermore, the non-magnetic conductive body 275 includes an upper non-magnetic conductive body 275a covering the upper coil 272a and a lower non-magnetic conductive body 275b covering the lower coil 272b.

Accordingly, the upper coil 272a and the upper non-magnetic conductive body 275a are arranged between the upper seating projection 256 and the middle seating projection 258, the lower coil 272b and the lower non-magnetic conductive body 275b are arranged between the middle seating projection 258 and the lower seating projection 257.

At this time, the respective projection lengths of the upper seating projection 256, the lower seating projection 257 and the middle seating projection 258 may be equal to or greater than a summing thickness of the coil 272 and the non-magnetic conductive body 275, that is, a stacking thickness thereof.

As aforementioned, the respective projection lengths of the upper seating projection 256, the lower seating projection 257 and the middle seating projection 258 is formed as being equal to or greater than a summing thickness of the coil 272 and the non-magnetic conductive body 275, and thus the coil 272 and the non-magnetic body 275 can be avoided being moved up and down and departed from the lens holder 255.

A stacking configuration of the non-magnetic conductive body 275 and the coil 272 is adapted in such a way that the non-magnetic conductive body 275 is wound firstly on the lens holder 255 and the coil is wound thereover; however, in the present embodiment, the coil 272 is wound firstly on the lens holder 255 and then the non-magnetic conductive body 275 is wound thereover.

The non-magnetic conductive body 275 may be formed to surround the overall lens holder 255, or only a surface thereof opposing to the magnet 271 may be mounted to the lens holder 255.

The non-magnetic conductive body 275 is formed as a band shape and surrounds the coil 272, and then one end and the other end of which are adhered to each other with adhesive agent and the upper part and lower part of which are adhered to the coil 272 and the lens holder 255.

The non-magnetic conductive body 275 is made with a copper plate or an aluminum plate, which is non-magnetic and at the same time conductive.

Hereinafter, operations of the second embodiment according to the present invention, as configured aforementioned, will be described in detail.

When a user pushes a picturing button through key pads installed on a communication device, the control unit drives the image sensor 280 to picture image of a subject to be pictured passed through the lens group.

The image sensor 280 converts the pictured image into electrical signals and transmits it to a main body through a main PCB.

The control unit to which the images are transmitted applies power source to the coil 272 for prosecuting focusing adjustment in case of the pictured image being not clear.

At this time, a direction of current applied to the upper coil 272a and a direction of current applied to the lower coil 272b are both directions.

Additionally, the upper coil 272a and the lower coil 272b are divided into a upper and a lower directions with the middle seating projection 258 not to be contacted with each other and thus the results affected by currents applied in both directions can be minimized.

When current is applied to the coil 272, electric magnetic force produced under Fleming left hand rule through magnetic flux from the magnet 271 to move the coil 272 in an optical axial direction.

Accordingly, the lens holder 255 to which the coil 272 is fixed is moved in an optical direction to adjust a focusing of the lens group, thereby making the image to be pictured clear.

During this procedure, the plate spring 265 acts to guide the lens holder 255 to be driven precisely in an optical axial direction.

Meanwhile, the non-magnetic conductive body 275 produces a spinning current damping force in an opposition direction to a movement direction within a magnetic field formed through the magnet 271 and thus dampens rapidly vibration of the lens holder 255.

That is, when the coil 272 is moved up and down, the lens holder 255 to which the coil 272 is fixed is moved up and down and thus the non-magnetic conductive body 275 fixed to the lens holder 255 is moved up and down by an up and down movement of the lens holder 255.

As the non-magnetic conductive body 275 is moved up and down within magnetic field of the magnet 271, the spinning current damping force is produced in an opposing direction to a movement direction of the non-magnetic conductive body 275 and dampens the vibration according to an up and down movement of the lens holder 255.

At this time, the spinning current dampening force applies to the non-magnetic conductive body 275 and further the non-magnetic conductive body 275 is supported up and down by the upper seating projection 256, the lower seating projection 257 and the middle seating projection 258. Therefore, even when the spinning current dampening force is applied to the non-magnetic conductive body 275, the non-magnetic conductive body 275 can be avoided being departed up and down from the lens holder 255.

As a result, the time of picturing an image of a subject to be pictured in the image sensor 280 can be faster.

Hereinafter, the third embodiment of the present invention will be described in detail.

FIG. 9 is a perspective view showing a plate spring of an assembled configuration of a lens holder and a non-magnetic conductive body mounted to the image photographing device according to a third embodiment of the present invention, and FIG. 10 is a cross-sectional view showing the image photographing device according to the third embodiment of the present invention.

The upper seating projection 256, the lower seating projection 257 and the middle seating projection 258 are further formed on the lens holder 255 of the present embodiment.

A projection length of the middle seating projection 258 is smaller than those of the upper seating projection 256 and the lower seating projection 257 and greater than a thickness of the coil 272.

Furthermore, the non-magnetic conductive body 275 is formed as a piece and covers all of the upper coil 272a, the middle seating projection 258 and the lower coil 272b between the upper seating projection 256 and the lower seating projection 257.

That is, according to the second embodiment of the present invention, the non-magnetic conductive body 275 is divided into the upper non-magnetic conductive body 275a and the lower non-magnetic conductive body 275b which are arranged on the upper part and lower part around the middle seating projection 258, respectively.

However, according to the third embodiment of the present invention, the non-magnetic conductive body 275 is formed as one piece and is configured to cover not only the upper coil 272a and the lower coil 272b but also the middle seating projection 258.

The operational procedures of the third embodiment are the same as the second embodiment and thus descriptions thereof are omitted.

The image photographing device according to the present invention is not limitative to aforementioned embodiments and thus can be varied and changed without departing from a spirit of the present invention.

The image photographing device provided with a damper according to the present invention is not limitative to aforementioned embodiments and thus can be varied and changed without departing from a spirit of the present invention.

INDUSTRIAL APPLICABILITY

As described aforementioned, the image photographing device according to the present invention returns rapidly the lens holder to its initial location when the lens holder is moved up and down, and noise produced from a contact of the plate spring with other components can be avoided.

The invention claimed is:

1. A small camera device comprising:
  a lens holder provided with lens and driven in an optical axial direction;
  a fixing unit housing the lens holder;
  a plate spring which is arranged to the upper part or lower part of the lens holder and connects the lens holder to the fixing unit and supports it so that the lens holder is moved in an optical axial direction;
  a magnet fixed to the fixing unit in a direction to the lens holder;
  coils surrounding the lens holder to be exposed to a magnetic field of the magnet; and
  a non-magnetic conductive body surrounding the lens holder in a parallel to the coils to be exposed to a magnetic field of the magnet wherein an upper seating projection is formed protrudingly on the upper part of the lens holder in an outer peripheral surface direction and a lower seating projection is formed protrudingly on the lower part of the lens holder in an outer peripheral surface direction, and further the coil and the non-magnetic conductive body are mounted to surround the lens holder between the upper seating projection and lower seating projection.

2. A small camera device as claimed in claim 1, wherein the projection lengths of the upper seating projection and the lower seating projection are larger than a summing thickness of the coil and the non-magnetic conductive body.

3. A small camera device provided with a damper as claimed in claim 1, wherein a middle seating projection is formed protrudingly on a middle part of the lens holder in an outer peripheral surface direction, and the coil includes an upper coil arranged between the upper seating projection and the lower seating projection and a lower coil arranged between the middle seating projection and the lower seating projection.

4. A small camera device as claimed in claim 3, wherein a projection length of the middle seating projection is larger than a summing thickness of the coil and the non-magnetic conductive body and the non-magnetic conductive body includes an upper non-magnetic conductive body covering the upper coil and a lower non-magnetic conductive body covering the lower coil.

5. A small camera device as claimed in claim 3, wherein a projection length of the middle seating projection is smaller than those of the upper seating projection and the lower seating projection and larger than a thickness of the coil, and further the non-magnetic conductive body covers all of the upper seating projection, the middle seating projection and the lower coil between the upper seating projection and the lower seating projection.

6. A small camera device provided with a damper as claimed in claim 2, wherein a middle seating projection is formed protrudingly on a middle part of the lens holder in an outer peripheral surface direction, and the coil includes an upper coil arranged between the upper seating projection and the lower seating projection and a lower coil arranged between the middle seating projection and the lower seating projection.

\* \* \* \* \*